(12) United States Patent
Biswal et al.

(10) Patent No.: US 11,938,820 B2
(45) Date of Patent: Mar. 26, 2024

(54) VOICE CONTROL OF VEHICLE SYSTEMS

(71) Applicant: Harman International Industries, Incorporated, Stamford, CT (US)

(72) Inventors: Rajesh Biswal, Bangalore (IN); Arindam Dasgupta, Kolkata (IN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 316 days.

(21) Appl. No.: 17/594,248

(22) PCT Filed: Apr. 9, 2019

(86) PCT No.: PCT/IB2019/052887
§ 371 (c)(1),
(2) Date: Oct. 7, 2021

(87) PCT Pub. No.: WO2020/208397
PCT Pub. Date: Oct. 15, 2020

(65) Prior Publication Data
US 2022/0185111 A1  Jun. 16, 2022

(51) Int. Cl.
*B60K 35/00* (2006.01)
*G10L 15/18* (2013.01)
(Continued)

(52) U.S. Cl.
CPC .......... *B60K 35/00* (2013.01); *G10L 15/1822* (2013.01); *G10L 15/22* (2013.01);
(Continued)

(58) Field of Classification Search
CPC ...... H04R 1/08; H04R 2499/13; B60K 35/00; B60K 2370/148; B60K 2370/592;
(Continued)

(56) References Cited

U.S. PATENT DOCUMENTS 7,228,275 B1  6/2007  Endo et al.
8,811,938 B2 *  8/2014  Paek ..................... G06F 1/1632
340/576

(Continued)

OTHER PUBLICATIONS

Zhu et al., AR-mentor: Augmented reality based mentoring system, 2014, IEEE, p. 17-22 (Year: 2014).*

(Continued)

*Primary Examiner* — McDieunel Marc
(74) *Attorney, Agent, or Firm* — McCoy Russell LLP (57) ABSTRACT

A system for controlling a vehicle includes a microphone, at least one vehicle component, and an interface system communicatively coupled to the microphone and the at least one vehicle component, the interface system configured to detect, via the microphone, an utterance of a vocal command by an occupant of the vehicle, transmit the utterance to at least one of a virtual personal assistant (VPA) of the vehicle and a VPA of a mobile device positioned within the vehicle, receive control signals from at least one of the VPA of the vehicle and the VPA of the mobile device, the control signals generated according to the vocal command, and transmit the control signals to the at least one vehicle component for controlling the at least one vehicle component.

18 Claims, 5 Drawing Sheets

(51) Int. Cl.
  *G10L 15/22* (2006.01)
  *G10L 15/26* (2006.01)
  *H04R 1/08* (2006.01)
  *G10L 15/08* (2006.01)

(52) U.S. Cl.
  CPC ................ *G10L 15/26* (2013.01); *H04R 1/08* (2013.01); *B60K 35/10* (2024.01); *B60K 35/80* (2024.01); *B60K 35/85* (2024.01); *B60K 2360/148* (2024.01); *B60K 2360/573* (2024.01); *B60K 2360/592* (2024.01); *G10L 2015/088* (2013.01); *G10L 2015/223* (2013.01); *H04R 2499/13* (2013.01)

(58) Field of Classification Search
  CPC .............. B60K 2370/573; G10L 15/26; G10L 15/1822; G10L 15/22; G10L 2015/088; G10L 2015/223
  See application file for complete search history.

(56) References Cited

U.S. PATENT DOCUMENTS

| | | | |
|---|---|---|---|
| 9,576,575 B2 | 2/2017 | Heide | |
| 10,110,272 B2 * | 10/2018 | Barnett, Jr. | ....... H04M 1/72412 |
| 10,540,970 B2 * | 1/2020 | Nandy | .................... H04W 4/80 |
| 10,629,199 B1 * | 4/2020 | Parthasarathy | ....... G10L 19/167 |
| 11,200,811 B2 * | 12/2021 | Kwatra | .................. G09B 19/24 |
| 11,270,699 B2 * | 3/2022 | Penilla | ............... G01C 21/3641 |
| 11,528,330 B2 * | 12/2022 | Golgiri | ................. B60W 50/14 |
| 2017/0076720 A1 | 3/2017 | Gopalan et al. | |
| 2017/0140759 A1 | 5/2017 | Kumar et al. | |
| 2018/0226077 A1 | 8/2018 | Choi et al. | |
| 2020/0207358 A1 * | 7/2020 | Katz | .................. G02B 27/0093 |

OTHER PUBLICATIONS

Spelta et al., Smartphone-Based Vehicle-to-Driver/Environment Interaction System for Motorcycles, 2010, IEEE, p. 39-42 (Year: 2010).*

Küpuska et al., Next-generation of virtual personal assistants (Microsoft Cortana, Apple Siri, Amazon Alexa and Google Home), 2018, IEEE, pg. (Year: 2018).*

Subudhi et al., Embedded design of a remote voice control and security system, 2008, IEEE, p. 1-6 (Year: 2008).*

ISA European Patent Office, International Search Report and Written Opinion Issued in Application No. PCT/IB2019/052887, dated Jul. 16, 2019, WIPO, 12 pages.

* cited by examiner

VOICE CONTROL OF VEHICLE SYSTEMS

CROSS-REFERENCE TO RELATED APPLICATIONS

The present application is a U.S. National Phase of International Patent Application Serial No. PCT/IB2019/052887, entitled "VOICE CONTROL OF VEHICLE SYSTEMS," and filed on Apr. 9, 2019. The entire contents of the above-listed application are hereby incorporated by reference for all purposes.

FIELD

The disclosure relates to an in-vehicle interface system and associated controls.

BACKGROUND

Vehicles may include an in-vehicle computing system, such as a head unit for an infotainment system, which may provide multimedia and control functions. For example, an in-vehicle computing system may provide navigational, multimedia playback, telephonic, social media interactive, mobile device charging, and/or other functions and receive user input to control elements of the vehicle and in-vehicle computing system. In order to provide such functionality, in-vehicle computing systems include complex and costly processing and memory resources that enable the execution of an operating system and various applications. Further, given such extended functionality, the control of such in-vehicle computing system may be overly complex for a user whose attention should be focused on safely operating the vehicle.

SUMMARY

In order to improve the control of an in-vehicle computing system, the in-vehicle computing system may accept voice commands as user input for controlling elements of the vehicle and the in-vehicle computing system. However, as the basic functionality of an in-vehicle computing system may already utilize the majority of processing capability and memory resources of the in-vehicle computing system, the in-vehicle computing system may not be able to support a complex voice control system. To overcome the limitations of an in-vehicle computing system, the processing capability and memory resources of a mobile device positioned with the vehicle may be leveraged to provide sophisticated voice control of vehicle components and the in-vehicle computing system.

Embodiments are disclosed for in-vehicle systems and methods of controlling vehicle systems with a mobile device in communication with the in-vehicle system. An example system for controlling a vehicle includes a microphone, at least one vehicle component, and an interface system communicatively coupled to the microphone and the at least one vehicle component, the interface system configured to detect, via the microphone, an utterance of a vocal command by an occupant of the vehicle, transmit the utterance to at least one of a virtual personal assistant (VPA) of the vehicle and a VPA of a mobile device positioned within the vehicle, receive control signals from at least one of the VPA of the vehicle and the VPA of the mobile device, the control signals generated according to the vocal command, and transmit the control signals to the at least one vehicle component for controlling the at least one vehicle component.

An example method of controlling vehicle systems of a vehicle with a mobile device includes receiving, at an in-vehicle interface system via a microphone, an utterance by an occupant of the vehicle, transmitting the utterance from the in-vehicle interface system to the mobile device, wherein the mobile device processes the utterance to determine a command, receiving, at the in-vehicle interface system, a control signal from the mobile device, the control signal generated by the mobile device according to the command, and transmitting the control signal from the in-vehicle interface system to at least one vehicle system of the vehicle for controlling the at least one vehicle system.

An example system for controlling a vehicle system of a vehicle includes a mobile device positioned with the vehicle, and an interface system integrated into the vehicle and communicatively coupled to the vehicle system and the mobile device, the interface system configured to receive, via a microphone, an utterance of a command by an occupant of the vehicle, transmit the utterance from the interface system to the mobile device, receive, at the interface system, a control signal from the mobile device, and transmit the control signal from the interface system to the vehicle system for controlling the vehicle system, wherein the mobile device is configured to receive the utterance from the interface system, convert the utterance to a natural language text, identify the command in the natural language text, generate the control signal according to the command, and transmit the control signal to the interface system.

BRIEF DESCRIPTION OF THE DRAWINGS

The disclosure may be better understood from reading the following description of non-limiting embodiments, with reference to the attached drawings, wherein below.

DETAILED DESCRIPTION

A virtual personal assistant (VPA) may include an automatic speech recognition system that detects a vocal command in a vocal utterance and performs an action responsive to the vocal command. For example, a VPA may detect a vocal command (e.g., "Turn up the volume," "Roll down the windows," "Navigate to the nearest gas station," "Play classical music," and so on), and then perform the command, if possible. While some functions, such as adjusting audio settings or adjusting the windows, may easily be carried out by an in-vehicle computing system, other functions, such as navigating to a particular location or playing a specific song by a specific musical artist on the stereo, may not be easily carried out by the in-vehicle computing system. As mentioned above, a mobile device may include available processing and/or storage resources that equal or exceed those resources typically used to provide the functionality associated with an in-vehicle computing system. In order to provide reliable voice control of vehicle systems, the disclosure provides systems and methods for selectively routing vocal commands to a VPA installed on a mobile device or to a VPA of an in-vehicle computing system.

Figure 1:
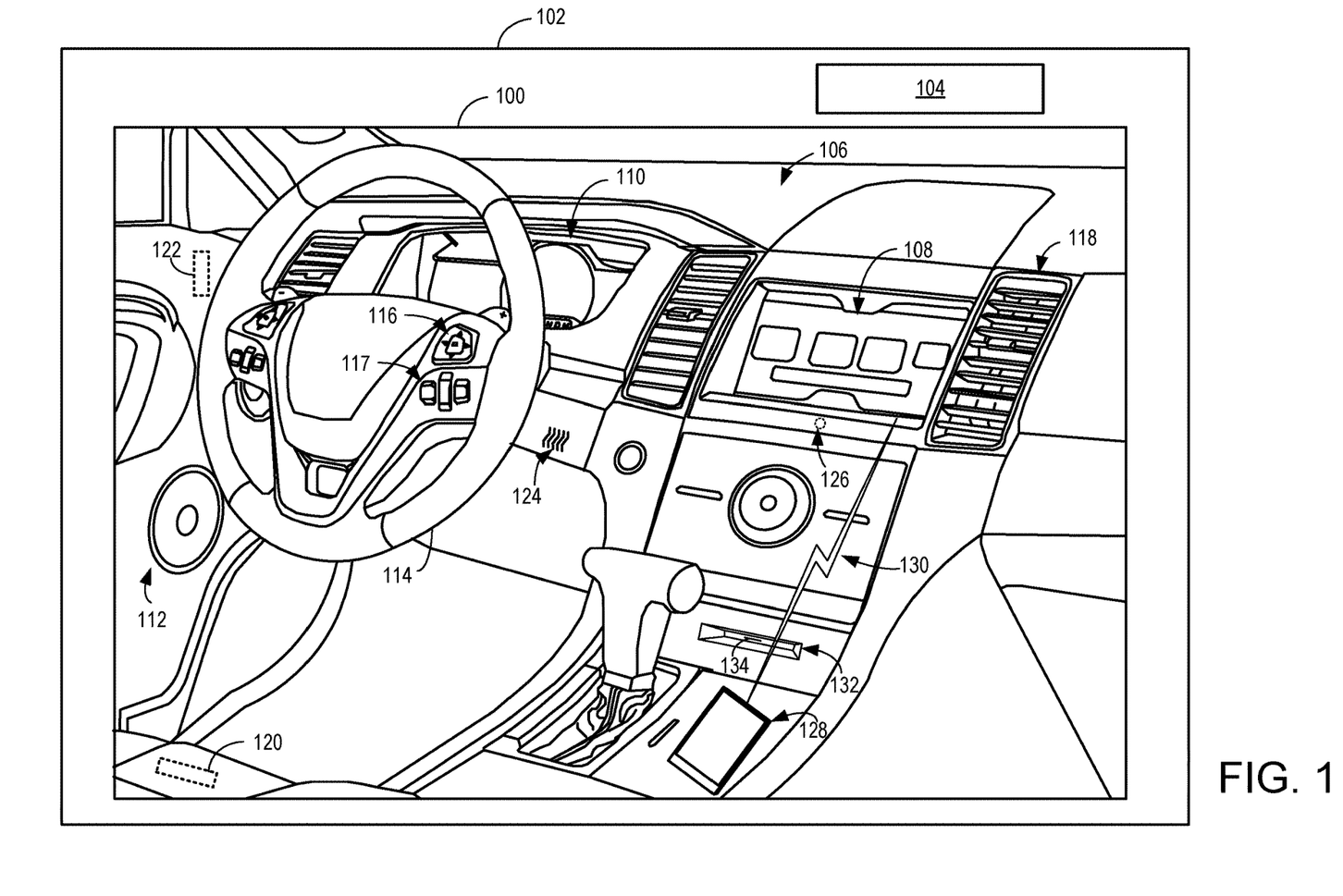
FIG. 1 is a partial view of a vehicle cabin including an in-vehicle computing system and a mobile device, in accordance with one or more embodiments of the present disclosure.

FIG. 1 shows an example partial view of an interior of a cabin 100 of a vehicle 102, in which a driver and/or one or more passengers may be seated. Vehicle 102 of FIG. 1 may be a motor vehicle including drive wheels (not shown) and an internal combustion engine 104. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a driver of vehicle 102, such as a touch screen 108 of an in-vehicle interface system (e.g., an infotainment system), an audio system control panel, and an instrument cluster 110. While the example system shown in FIG. 1 includes audio system controls that may be performed via a user interface of an in-vehicle interface system such as touch screen 108 without a separate audio system control panel, in other embodiments, the vehicle 102 may include an audio system control panel, which may include controls for a conventional vehicle audio system such as a radio, compact disc player, MP3 player, and so on. The audio system controls may include features for controlling one or more aspects of audio output via speakers 112 of a vehicle speaker system. For example, the audio system controls may control a volume of audio input, a distribution of sound among the individual speakers of the vehicle speaker system, an equalization of audio signals, and/or any other aspect of the audio output.

Instrument cluster 110 may include various gauges such as a fuel gauge, tachometer, speedometer, and odometer, as well as indicators and warning lights. A steering wheel 114 may project from the instrument panel 106 below instrument cluster 110. Optionally, steering wheel 114 may include controls 116 which may be used in conjunction with touch screen 108 to navigate features of an in-vehicle interface system and to control the in-vehicle interface system. As an illustrative example, controls 116 may include a button 117 which activates or initiates voice control of the in-vehicle interface system. For example, responsive to the button 117 being pressed and/or while the button 117 is being pressed, a microphone 126 may record one or more utterances by a driver or other passenger of the vehicle. The one or more utterances recorded via the microphone 126 may then be used to navigate or control one or more features of the in-vehicle interface system if the one or more utterances comprises a voice command.

In addition to the components depicted in FIG. 1, it will be appreciated that instrument panel 106 may include additional components such as door and window controls, a cigarette lighter which may also be used as a low-voltage power outlet, a glove compartment, and/or any other suitable elements. In one or more embodiments, control of in-vehicle climate via climate control system vents 118 may be performed using touch screen 108 and thus no separate climate control interface may be included in instrument panel 106. In alternative embodiments, however, a separate climate control interface may be provided.

The cabin 100 may include one or more sensors for monitoring the vehicle, the user, and/or the environment. For example, the cabin 100 may include one or more seat-mounted pressure sensors 120 configured to measure the pressure applied to the seat to determine the presence of a user. The cabin 100 may include one or more door sensors 122 configured to monitor door activity, such as the opening and/or closing of the door, the locking of the door, the operation of a window of the door, and/or any other suitable door activity event. A humidity sensor 124 may be included to measure the humidity content of the cabin 100. A microphone 126 may be included to receive user input in the form of voice commands, to enable a user to conduct telephone calls, and/or to measure ambient noise in the cabin 100. It is to be understood that the placement of the sensors illustrated in FIG. 1 is exemplary, and one or more additional or alternative sensors may be positioned in an engine compartment, on an external surface of the vehicle, and/or in other suitable locations for providing information regarding the operation of the vehicle, ambient conditions of the vehicle, a user of the vehicle, and so on.

The cabin 100 may also include one or more user objects, such as mobile device 128, that are stored in the vehicle before, during and/or after traveling. The mobile device may include a smart phone, a tablet, a laptop computer, a portable media player, and/or any suitable mobile computing device. The mobile device 128 may be connected to the in-vehicle interface system via communication link 130. The communication link 130 may be wired (e.g., via Universal Serial Bus [USB], Mobile High-Definition Link [MHL], High-Definition Multimedia Interface [HDMI], and so on) or wireless (e.g., via BLUETOOTH, WI-FI, Near-Field Communication [NFC], and so on) and configured to provide two-way communication between the mobile device 128 and the in-vehicle interface system. For example, the communication link 130 may provide sensor and/or control signals from in-vehicle systems and the touch screen 108 to the mobile device 128 and may provide control and/or display signals from the mobile device 128 to in-vehicle systems and the touch screen 108. The communication link 130 may also provide power to the mobile device 128 from an in-vehicle power source in order to charge an internal battery of the mobile device 128.

While the mobile device 128 is illustrated as being spatially separated from the in-vehicle interface system and connected via a substantially external communication link (e.g., a cable or radiofrequency signal), it is to be understood that a mobile device storage structure 132 or other storage structure may be formed in the instrument panel 106 or another location in the vehicle to hold the mobile device 128 in a particular location. The mobile device storage structure 132 may include an integrated connector 134 to which the mobile device 128 may be attached or "docked" for providing a substantially internal communication link between the mobile device 128 and the interface system.

Figure 2:
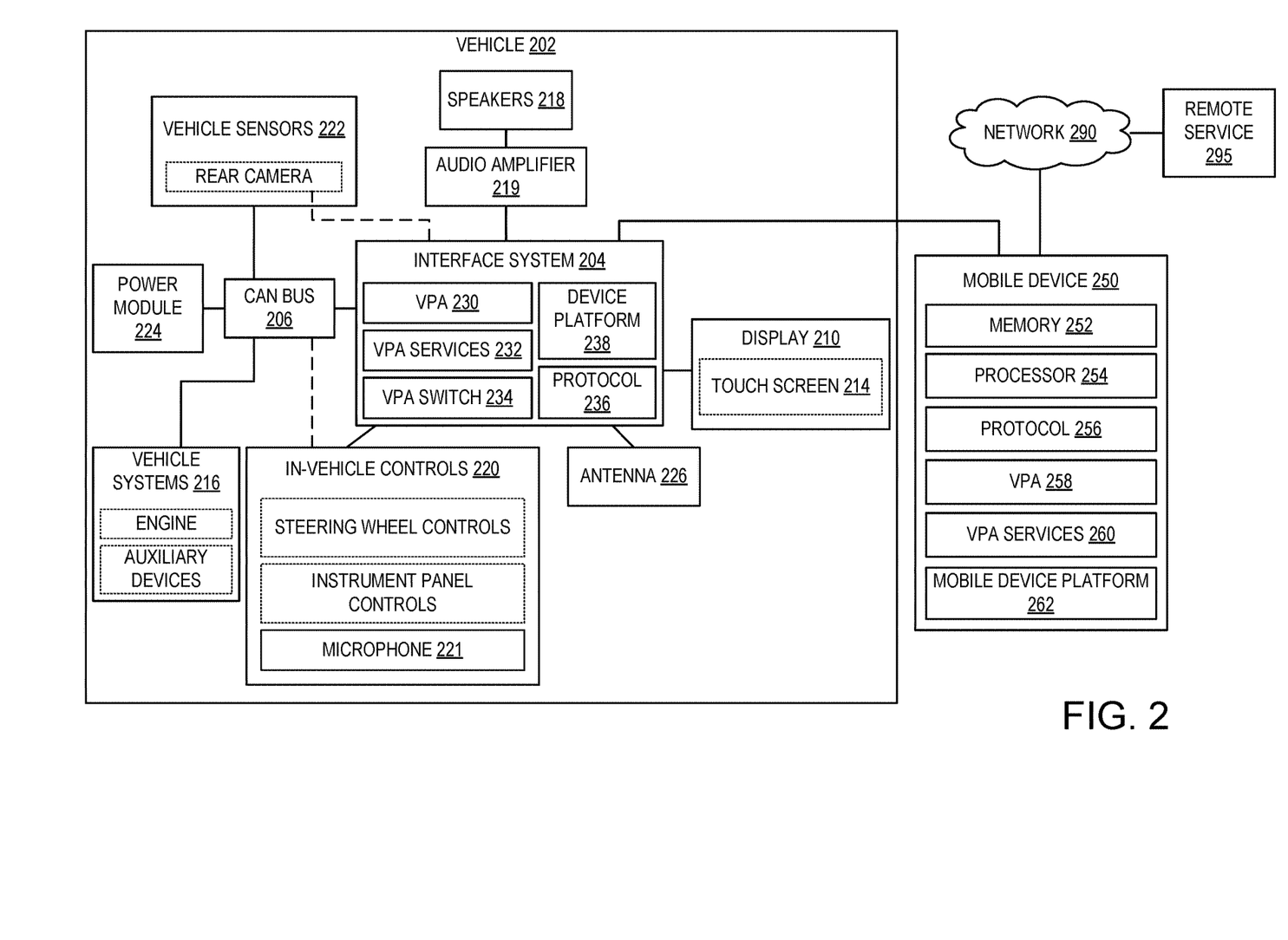
FIG. 2 is a block diagram of an interface system within a vehicle, in accordance with one or more embodiments of the present disclosure.

FIG. 2 shows a block diagram of an in-vehicle interface system 204 and related elements with which the in-vehicle interface system 204 is in communication. The in-vehicle interface system 204 may be located and/or integrated within a vehicle 202, such as vehicle 102 of FIG. 1. The in-vehicle interface system 204 may communicate with one or more elements within the vehicle, including but not limited to vehicle systems connected via an in-vehicle interconnect, such as Controller-Area-Network (CAN) bus 206. It is to be understood that any suitable number and/or combination of interconnects may be used to permit communication between the in-vehicle interface system 204, or simply the interface system 204, and various in-vehicle components, including but not limited to CAN buses, Media Oriented Systems Transport (MOST) buses, Ethernet-based interconnects, and so on. Interconnects may communicate directly with in-vehicle components and/or may communicate with such components via intervening processors. In some embodiments, one or more in-vehicle components may communicate directly with the interface system 204 without or in addition to communicating with the interface system 204 via the CAN bus 206.

The interface system 204 may pass information from the CAN bus to an external mobile device 250 in order to leverage the memory 252 and processor 254 as well as other computing resources of the mobile device 250 for controlling various in-vehicle elements of the vehicle 202. The interface system 204 may be connected to the mobile device 250 via a wired connection in some embodiments. In additional or alternative embodiments, the interface system 204 may include a wireless gateway and/or a protocol 236, enabling wireless connectivity between the interface system 204 and the mobile device 250. The mobile device 250 similarly includes a protocol 256 for enabling communication between the interface system 204 and the mobile device 250. The protocols 236 and 256 may comprise a standard protocol such as Smart Device Link (SDL), for example, or a proprietary protocol.

The display 210 may display images to provide visual feedback related to navigation, media playback, telephone, vehicle system control (e.g., cabin temperature control, cruise control settings, odometer output/settings, vehicle diagnostics control, vehicle operating mode control, and so on), and/or other vehicle-related functions. In some embodiments, the display 210 may include a touch screen 214, such as touch screen 108 of FIG. 1, enabling user input for controlling the vehicle-related functions to be received via the display 210.

The mobile device 250 may receive signals from the interface system 204 and/or the display 210, process the signals based on non-transitory instructions stored on the memory 252 and executed by the processor 254, and output display and/or control signals to the display 210 and/or the interface system 204. In some embodiments, the mobile device 250 may communicate with a remote service 295 via a network 290. In such embodiments, the mobile device 250 may leverage the computing resources of the remote service 295 and/or additional information stored at the remote service 295 to perform and/or assist with the processing of the signals from the interface system 204. For example, the mobile device 250 may utilize the remote service 295 to assist with generating a response to a particular user input. Although one remote service is illustrated in FIG. 2, it is to be understood that the mobile device 250 may communicate with one or more remote services including remote service 295 during operation.

As illustrated, the mobile device 250 is separate from and not integrated within the vehicle 202, although the mobile device 250 may be located within the vehicle cabin during travel and while connected to the interface system 204 (e.g., via a communication link, such as communication link 130 of FIG. 1). In contrast, each of the other systems and elements illustrated within the vehicle 202 in FIG. 2 may be integrated within the vehicle. The mobile device 250 may include computing resources (e.g., memory 252 and processor 254) that are separate from computing resources integrated within the vehicle 202 (e.g., the computing resources utilized by the components illustrated within the vehicle 202 of FIG. 2). While the mobile device 250 may operate in accordance with an operating system and run one or more applications, in some embodiments, the interface system 204 and/or display 210 may not include an operating system and/or computing resources for operating in accordance with an operating system or running applications. For example, in such embodiments, the display 210 and the interface system 204 may not provide any user interface when disconnected from the computing resources (e.g., memory 252 and processor 254) of the mobile device 250. In some embodiments, the display 210 and the interface system 204 may not include a memory device and/or a processor. In other embodiments, the display 210 and the interface system 204 may include a memory device and/or a processor capable of providing basic functionality related to the elements (e.g., displaying images in accordance with display instructions and/or transmitting/receiving signals). In such embodiments, the memory device(s) and/or processor(s) of the display 210 and/or the interface system 204 may not include or be capable of running an operating system and/or providing a user interface when operating independently from the mobile device 208.

Display signals may control the output of display 210, while control signals may control one or more other vehicle systems 216 in communication with the interface system 204. For example, the vehicle systems 216 may include controllable elements related to the engine and/or auxiliary elements, such as windshield wipers, windows, doors/door locks, headlights, air conditioning systems, and so on. The control signals may also control audio output at one or more speakers 218 of the vehicle 202. For example, the control signals may adjust audio output characteristics such as volume, equalization, audio image (e.g., the configuration of the audio signals to produce audio output that appears to a user to originate from one or more defined locations), audio distribution among a plurality of speakers 218, and so on.

User input may be accepted via one or more in-vehicle controls 220 transmitted to the interface system 204 and/or the mobile device 250 as additional or alternative input sources to the optional touch screen of display 210, for example. The in-vehicle controls 220 may include any suitable user-actuatable element within and/or on the vehicle, including but not limited to any number or combination of buttons, sliders, switches, knobs, levers, joysticks, key pads, pedals, and so on. For example, in-vehicle controls 220 may include control elements within a cabin of the vehicle 202, such as steering wheel controls (e.g., steering wheel-mounted audio system controls, cruise controls, windshield wiper controls, headlight controls, turn signal controls, and so on), instrument panel controls, accelerator/brake/clutch pedals, a gear shift, door/window controls positioned in a driver or passenger door, seat controls, cabin light controls, audio system controls, cabin temperature controls, and so on. Control elements positioned on an outside of a vehicle (e.g., controls for a security system) may also be connected to the interface system 204 via the CAN bus 206. The control elements of the in-vehicle controls 220 may be physically and permanently positioned on and/or in the vehicle for receiving user input, even when the mobile device 250 is removed from the vehicle.

As a specific example, the in-vehicle controls 220 may include a microphone 221 integrated within the cabin of the vehicle 202 which records or senses user input such as voice control commands that are routed to the interface system 204 and/or the mobile device 250. As another example, the steering wheel controls and/or the instrument panel controls of the in-vehicle controls 220 may include the button 117 depicted in FIG. 1 for initiating voice control, wherein pressing the button 117 indicates that utterances sensed by the microphone 221 comprise voice commands. In this way, utterances not intended for voice control of vehicle elements may not be inadvertently processed by the interface system 204 and/or the mobile device 250 for controlling one or more elements of the vehicle 202. Additionally or alternatively, the user may indicate that an utterance is intended for voice control by uttering a wake word (e.g., a particular voice data string, which may be a word, phrase, tone, or other predefined sound) for voice control. For example, the interface system 204 and/or the mobile device 250 may monitor audio recorded by the microphone 221 and specifically process the audio to detect the wake word without otherwise processing or handling the audio, and in response to detecting the wake word being uttered by an occupant of the vehicle 202, the interface system 204 and/or the mobile device 250 may activate respective VPAs 230 and 258 for processing an utterance sensed by the microphone 221 and following the wake word or trigger word, as described further herein.

The CAN bus 206 may communicate with one or more vehicle sensors 222 in order to provide an indication of operating states and/or conditions of the vehicle to the interface system 204. The interface system 204 may pass the sensor signals from the vehicle sensors 222 to the mobile device 250 in order to provide contextual information relating to the operation and/or environment of the vehicle and/or user to the mobile device 250. The vehicle sensors 222 may include any suitable sensor, such as the in-cabin sensors described herein above with regard to FIG. 1, vehicle operating state sensors (e.g., sensors monitoring fuel storage, engine temperature, oil storage, engine speed, vehicle speed, transmission/gear settings, tire pressure, traction, diagnostics information, and so on), and environmental sensors (e.g., a rear camera and/or other sensors monitoring ambient conditions, such as temperature, humidity, pressure, road surface/conditions, and so on). Upon receiving the user input and/or the sensor signals at the mobile device 250, the mobile device 250 may determine an adjustment to the display 210 and/or control instructions for the one or more vehicle systems 216.

Information regarding power states and/or power control signals may be exchanged between a power module 224 and the mobile device 250 via the CAN bus 206 and the interface system 204. For example, the mobile device 250 may receive information from the power module 224 and update the display 210 to provide feedback to the user regarding the power state of the one or more vehicle components. The mobile device 250 may additionally or alternatively provide control signals to the power module 224 based on user input, information received from the vehicle sensors 222, and/or information received from the power module 224.

An antenna 226 may provide AM/FM radio signals to the interface system 204 for processing at the mobile device 250 and/or the interface system 204. For example, the mobile device 250 may control the speakers 218 to control audio broadcast by AM/FM radio stations and control the display 210 to display information related to the AM/FM radio stations and/or content being broadcast (e.g., information broadcast alongside the audio via a radio data system).

In order to communicate with the varied vehicle systems and mobile device 250 as described above, the interface system 204 may include one or more modules in some embodiments for resolving different communication protocols and other issues that may arise while passing signals between disparate systems. For example, the interface system 204 may include a video switching module (not shown) to synchronize and/or format a video feed from a rear camera for display on the display 210. As another example, the interface system 204 may include an encoder (not shown) and/or a decoder (not shown) for converting signals received from one system and/or device to a format that is compatible with or otherwise able to be interpreted by a target system and/or device. It is to be understood that one or more of the above-described modules are optional, and in some embodiments, the interface system 204 may pass received signals to another system and/or device without providing any adjustment to the signals.

The interface system 204 includes a device platform 238 comprising an infotainment platform which provides primitives to communicate with components of the vehicle 202. For example, the device platform 238 may generate the user interface for display via the display 210 and/or communicate with one or more components of the vehicle 202, including but not limited to the speakers 218 via the audio amplifier 219, the vehicle sensors 222, the power module 224, the vehicle systems 216, the in-vehicle controls 220, and/or the antenna 226, for providing commands to one or more of the vehicle components and/or receiving signals from one or more of the vehicle components.

The interface system 204 includes a virtual personal assistant (VPA) 230 for supporting voice dialogs between a user of the vehicle 202 and the interface system 204. The VPA 230 comprises a speech processing module that processes voice commands, such as voice commands received from the microphone 221. The VPA 230 thus performs automatic speech recognition on a received vocal utterance received via the microphone 221 to convert the vocal utterance to natural language text, and processes the natural language text to identify a vocal command from the vocal utterance. The VPA 230 may further provide an audio response, for example, by using text-to-speech, which may be output via the speakers 218.

To implement the command of the voice command identified by the VPA 230, the interface system 204 further includes a VPA services module 232 that provides access to device functions. In particular, the VPA services module 232 provides a catalog of device functions and an interface for executing device functions which map commands to appropriate components of the vehicle 202. For example, a voice utterance received by the microphone 221 may be processed by the VPA 230 to identify a command "change equalizer to jazz" in the voice utterance. The VPA services module 232 links the command from the voice utterance identified by the VPA 230 to a corresponding device function which may be executed, for example, by the device platform 238. For example, the VPA services module 232 may route the "change equalizer to jazz" command identified by the VPA 230 to the device platform 238 which in turn controls the audio equalization settings of the audio amplifier 219 and/or the speakers 218 to a combination of equalizations settings predetermined and optimized for jazz music. Alternatively, rather than providing the command to the device platform 238, in some examples the VPA services module 232 may directly communicate with and control one or more components of the vehicle 202 according to the command.

The interface system 204 further includes a VPA switch 234 for arbitrating between the VPA 230 of the vehicle 202 and the VPA 258 of the mobile device 250. The VPA switch 234 routes an utterance sensed by the microphone 221, for example, to the VPA 230 of the interface system 204, to the VPA 258 of the mobile device 250, or to both the VPA 230 and the VPA 258. Various methods for routing an utterance to one or more of the VPA 230 and the VPA 258 are described further herein with regard to FIGS. 3-5.

As mentioned above, the mobile device 250 includes a VPA 258 for supporting voice dialogs between a user of the vehicle 202 and the interface system 204. Similar to the VPA 230 of the interface system 204, the VPA 258 of the mobile device 250 comprises a speech processing module that processes voice commands, such as voice commands received from the microphone 221 and/or from a microphone (not shown) of the mobile device 250. The VPA 258 thus performs automatic speech recognition on a received vocal utterance received via the microphone 221 to convert the vocal utterance to natural language text, and processes the natural language text to identify a vocal command from the vocal utterance. The VPA 258 may further provide an audio response, for example, by using text-to-speech, which may be output via the speakers 218.

The mobile device 250 further includes a VPA services module 260 providing a catalog of device functions and an interface for executing device functions which map commands to appropriate components of the vehicle 202. The VPA services module 260 may further map commands to a mobile device platform 262.

The VPA 258 of the mobile device 250 and the VPA 230 of the vehicle 202 may be identical, in some examples. In other examples, the VPA 258 may include extended functionality with respect to the VPA 230. As a specific example, the VPA 230 may be equipped with a limited vocabulary specific to control of various vehicle components, and therefore the VPA 230 may be limited to enabling voice control of vehicle components. In contrast, the VPA 258 may be equipped with a larger vocabulary which is not limited to control of various vehicle components. Further, the VPA 258 may access an even larger vocabulary by communicating with a remote service 295 via the network 290. As an example, the VPA 230 may support adjusting control of the audio amplifier 219 and the speakers 218, for example by adjusting volume or equalization, and further the VPA 230 may support controlling the device platform 238 to change radio transmissions received via the antenna 226. However, if the user vocally commands the VPA 230 to play a particular song by a particular artist, the vocabulary of the VPA 230 may be too limited to understand the command. Furthermore, the functionality of the device platform 238 may not support streaming music that is not stored locally. In contrast, the VPA 258 may be able to process the vocal command to play the particular song by the particular artist, and furthermore may be able to stream the particular song via the mobile device platform 262 and/or the remote service 295.

Figure 3:
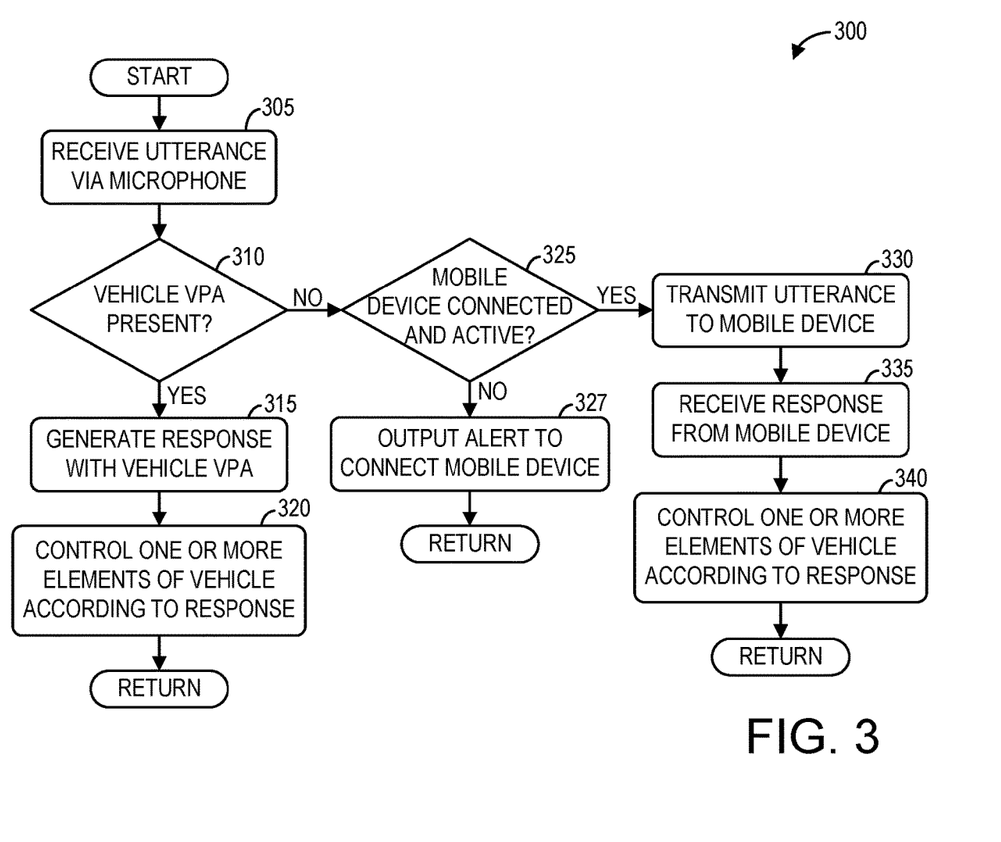
FIG. 3 is a flow chart of a method for selecting a virtual personal assistant of a vehicle or a mobile device for controlling one or more vehicle systems, in accordance with one or more embodiments of the present disclosure.

FIG. 3 is a flow chart of an example method 300 for routing an utterance by a user to a virtual personal assistant (VPA) of a vehicle or a mobile device. The method 300 may be performed by a system within a vehicle, such as an in-vehicle interface system. Further, one or more actions of the method 300 may be performed by an in-vehicle interface system, while other actions of the method 300 may be performed by a mobile device positioned within the vehicle and communicatively coupled to the in-vehicle interface system.

Method 300 begins at 305. At 305, method 300 includes receiving an utterance via a microphone. The utterance comprises one or more words spoken by a person in the vehicle, which may comprise a vocal command to control one or more components of the vehicle. A VPA switch of the in-vehicle interface system, such as VPA switch 234 of the interface system 204, may receive the utterance via the microphone, which may comprise a microphone of the vehicle such as microphone 126 or the microphone 221, or alternatively may comprise a microphone of the mobile device. Further, method 300 may receive the utterance responsive to detecting a wake word uttered by the user or occupant of the vehicle. Method 300 may receive the utterance spoken after the utterance of the wake word, and may complete reception of the utterance in response to an additional trigger word or in response to a threshold duration elapsing after receiving the utterance without sensing additional utterance(s) by the user via the microphone. As another example, method 300 may receive the utterance responsive to detecting a voice control button being pressed, such as the button 117, being pressed. Further, the VPA switch 234 may receive the utterance via the microphone. As described further herein, the VPA switch 234 determines in method 300 whether to route the utterance to a vehicle VPA or to a mobile device VPA.

After receiving the utterance, method 300 continues to 310. At 310, a VPA switch such as the VPA switch 234 determines if a vehicle VPA, such as the VPA 230 of the interface system 204, exists or is present. For example, a vehicle VPA such as the VPA 230 may comprise an optional component of the vehicle, such as the vehicle 202, and so in some instances the vehicle may not be equipped with a vehicle VPA in order to reduce cost of the vehicle. Nevertheless, the interface system 204 may include the VPA switch 234 for routing utterances in case a vehicle VPA is eventually installed in the vehicle. Method 300 therefore determines whether a vehicle VPA is installed within the vehicle and connected to the VPA switch 234, for example.

If a vehicle VPA is present ("YES"), method 300 continues to 315. At 315, the VPA switch routes the utterance to the vehicle VPA to generate a response comprising one or more control signals according to the utterance. For example, method 300 may process the utterance with the VPA 230 to perform automatic speech recognition. That is, the VPA 230 converts the utterance to natural language text. The VPA 230 may further process the natural language text to identify a command in the utterance. As an example, the VPA 230 may compare the natural language text derived from the utterance to commands stored in the catalog of commands in the VPA services module 232. The VPA 230 may thus determine that at least a portion of the natural language text corresponds to a command. In some examples, the VPA 230 may determine that the natural language text does not include a command responsive to even a portion of the natural language text not matching to any command in the catalog of commands stored in the VPA services module 232. In any case, the VPA 230 generates a response to the utterance comprising a control signal to be transmitted to one or more components by the VPA services module 232.

Continuing at 320, method 300 includes controlling one or more elements of the vehicle according to the response generated at 315. In an instance wherein the utterance does not include a command or at least a valid command for controlling a component of the vehicle, the response may indicate that the utterance did not include a valid command, and so method 300 may control one or more elements of the vehicle, such as the display device 210 and/or the speakers 218, to inform the user that the utterance did not include a valid command. For example, method 300 may control the display device 210 to display a message indicating that the utterance did not include a valid command, and/or method 300 may control the speakers 218 to playback a tone or a voice message indicating that the utterance did not include a valid command. Method 300 then returns. Thus, in some examples, method 300 may use the vehicle VPA to control one or more components of a vehicle responsive to and according to an utterance spoken by a user of the vehicle.

However, referring again to 310, if a vehicle VPA is not present ("NO"), method 300 continues to 325. At 325, method 300 includes determining whether a mobile device, such as the mobile device 128 or 250, is connected and active. For example, a mobile device may be determined to be connected upon establishing a wired or wireless connection to an interface system, such as interface system 204 of FIG. 2, and/or upon completing a data transaction between the mobile device and the interface system (e.g., receiving data from the mobile device, performing a handshake operation, and so on). The mobile device may be determined to be active while the mobile device is running a vehicle interface application and/or otherwise capable of receiving signals from the vehicle, processing the received signals, and transmitting signals to control one or more vehicle systems.

Responsive to determining that the mobile device is not connected and/or not active ("NO") at 325, method 300 proceeds to 327. At 327, method 300 includes outputting an alert to connect and/or activate the mobile device. For example, method 300 may display an image on a display device integrated in the vehicle (e.g., display 210 of FIG. 2). Additionally or alternatively, method 300 may play a prerecorded audio message or audio tone via one or more speakers integrated in the vehicle (e.g., speakers 218 of FIG. 2). Method 300 then returns. Thus, method 300 may not control one or more components of the vehicle according to the utterance if a vehicle VPA is not present and a mobile device is not connected and active.

Referring again to 325, if method 300 determines that a mobile device is connected and active ("YES"), method 300 continues to 330. At 330, method 300 includes transmitting the utterance to the mobile device. For example, for the interface system 204, the VPA switch 234 routes the utterance, via the protocol 236, to the mobile device 250. The mobile device 250 then processes the utterance with a VPA installed on the mobile device (e.g., VPA 258 of FIG. 2) and generates a response for the utterance. At 335, method 300 includes receiving the response generated by the VPA of the mobile device from the mobile device. For example, the VPA services module 260 of the mobile device 250 may transmit the response, via the protocol 256 of the mobile device 250, to the interface system 204 of the vehicle 202. The interface system 204 receives the response, for example via the protocol 236, and at 340, method 300 includes controlling one or more elements or components of the vehicle according to the response. Method 300 then returns.

Thus, in some examples, the VPA switch 234 may route an utterance to the vehicle VPA 230 or to the mobile device VPA 258 depending on whether the vehicle VPA 230 is installed in the vehicle 202.

Figure 4:
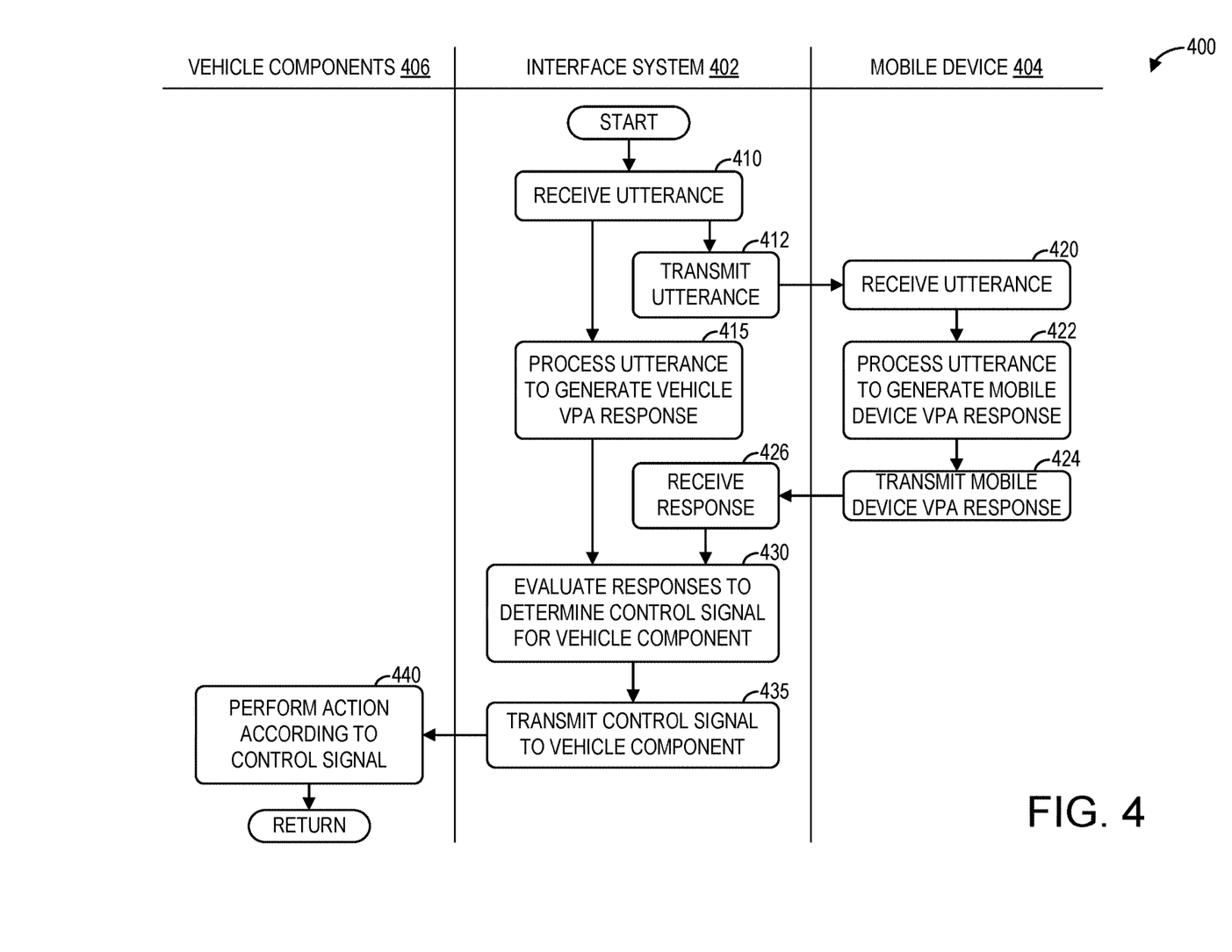
FIG. 4 is a flow chart of a method of parallel processing a voice command with virtual personal assistants of a vehicle and a mobile device for controlling one or more vehicle systems, in accordance with one or more embodiments of the present disclosure.

However, in some examples wherein both the vehicle VPA 230 and the mobile device VPA 258 are present in the vehicle 202, the VPA switch 234 may route an utterance to both VPAs 230 and 258. As an example, FIG. 4 is a flow chart of an example method 400 for parallel processing of an utterance according to an embodiment. In particular, method 400 relates to simultaneous or parallel processing of an utterance with a vehicle VPA of an in-vehicle interface system 402 and a mobile device VPA of a mobile device 404, and controlling one or more vehicle components 406 according to the output of the vehicle VPA and/or the mobile device VPA. The vehicle VPA of the in-vehicle interface system 402 may correspond to the VPA 230 of the interface system 204, and the mobile device VPA of the mobile device 404 may correspond to the VPA 258 of the mobile device 250 described hereinabove. The one or more vehicle components 406 may correspond to one or more components of the vehicle 202 described hereinabove, including but not limited to a display 210, vehicle systems 216, speakers 218 and/or an audio amplifier 219, in-vehicle controls 220, vehicle sensors 222, a power module 224, an antenna 226, a device platform 238, and so on.

Method 400 begins at 410. At 410, the interface system 402 receives an utterance, sensed for example by a microphone in the vehicle such as microphone 221, at a VPA switch such as VPA switch 234. At 412, the VPA switch transmits the utterance from the interface system 402 to the mobile device 404, for example via protocols 236 and 258. At 420, the mobile device 404 receives the utterance from the interface system 402. At 422, the mobile device 404 processes the utterance with the mobile device VPA to generate a mobile device VPA response. At 424, the mobile device 404 transmits the mobile device VPA response to the interface system 402. The interface system 402 receives the mobile device VPA response at 426.

Meanwhile, as the mobile device 404 processes the utterance as described above, method 400 proceeds from 410 to 415. At 415, the interface system 402 processes the utterance with a vehicle VPA to generate a vehicle VPA response. At 430, the interface system 402 evaluates the vehicle VPA response and the mobile device VPA response to determine one or more control signals for one or more target vehicle components specified by the responses. As an illustrative example, the VPA switch may evaluate the vehicle VPA response and the mobile device VPA response according to which response is received first. As another example, the VPA switch may evaluate the vehicle response and the mobile device VPA response to determine whether the responses are different. If the responses are the same, the VPA switch uses either response as a control signal. However, if the responses are different, the VPA switch may determine that one of the responses is better than the other, and may select the best response for use as the control signal. For example, the utterance may comprise a vocal command to navigate to a particular location with a location name. The vehicle VPA response may comprise a control signal to initiate a navigation system in the device platform, for example, as well as a control signal for the display device and/or the speakers to indicate that the VPA could not understand the location name. Meanwhile, the mobile device VPA response may comprise a control signal to initiate the navigation system for navigating to the particular location. The VPA switch may select the mobile device VPA response as the control signal as the mobile device VPA response is a complete response whereas the vehicle VPA response is an incomplete response. As yet another example, the VPA switch may use the response received first as a control signal, and may evaluate the response received second to determine whether the second response is superior to the first response. For example, in the above example wherein the mobile device VPA accurately resolves the location name while the vehicle VPA does not resolve the location name, the VPA switch may receive the vehicle VPA response first and thus the interface system 402 may initiate the navigation system with the indication that the location name was not resolved, and then upon receiving the mobile device VPA response, the interface system 402 may override the first response with the second response so that the navigation system navigates to the particular location.

Thus, continuing at 435, the interface system 402 transmits the one or more control signals to the one or more target vehicle components. At 440, the one or more target vehicle components of the vehicle components 406 perform one or more actions according to the control signal. Method 400 then returns.

Thus, in some examples, the utterance may be processed by both the vehicle VPA and the mobile device VPA, and one or more vehicle components may subsequently be controlled according to the response from the vehicle VPA, the response from the mobile device VPA, or both responses.

Figure 5:
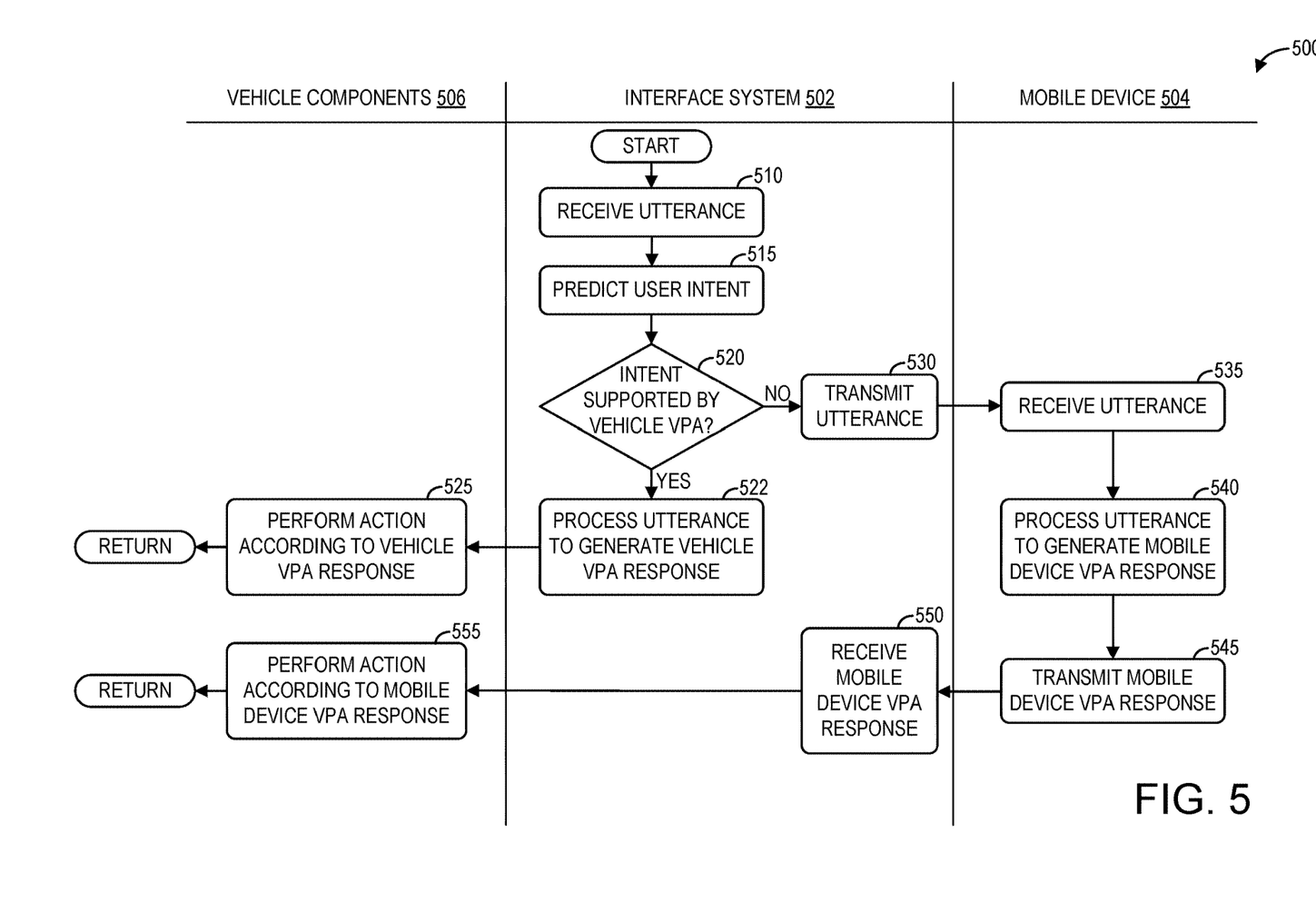
FIG. 5 is a flow chart of a method for switching between virtual personal assistants of a vehicle and a mobile device according to an intent, in accordance with one or more embodiments of the present disclosure.

In other examples, the VPA switch may selectively route the utterance to the vehicle VPA or the mobile device VPA according to the intention of the user. As an illustrative and non-limiting example, FIG. 5 is a flow chart of a method 500 for selectively distributing an utterance between a vehicle VPA and a mobile device VPA. In particular, method 500 relates to determining an intent of an utterance, routing the utterance to either a vehicle VPA of an in-vehicle interface system 502 or a mobile device VPA of a mobile device 504 according to the intent of the utterance, and controlling one or more vehicle components 506 according to the output of the vehicle VPA and/or the mobile device VPA. The vehicle VPA of the in-vehicle interface system 502 may correspond to the VPA 230 of the interface system 204, and the mobile device VPA of the mobile device 504 may correspond to the VPA 258 of the mobile device 250 described hereinabove. The one or more vehicle components 506 may correspond to one or more components of the vehicle 202 described hereinabove, including but not limited to a display 210, vehicle systems 216, speakers 218 and/or an audio amplifier 219, in-vehicle controls 220, vehicle sensors 222, a power module 224, an antenna 226, a device platform 238, and so on.

Method 500 begins at 510. At 510, the interface system 502 receives the utterance. At 515, the interface system 502 predicts the user intent based on at least a portion of the utterance. For example, the VPA switch of the interface system 502 may be configured to convert an initial portion of the utterance (e.g., one or more first words of the utterance) to natural language text and determine whether the natural language text of the initial portion includes a command word. Such a command word in the initial portion of the utterance may indicate the intent of the user. For example, if the initial portion of the utterance includes the word "navigate" or "directions," the VPA switch may determine that the user intent is to obtain directions or assistance navigating to a given location. As another example, if the initial portion of the utterance includes the word "increase" or "decrease," the VPA switch may determine that the user intent is to adjust the settings of a vehicle system, such as the audio system, one or more in-vehicle controls, or one or more vehicle systems (e.g., adjusting cruise control speed, adjusting climate control settings, adjusting audio volume, and so on). Thus, the VPA switch may include a table of command words linked to different intended functions. At 520, the interface system 502 determines whether the intent is supported by the vehicle VPA. For example, the table of command words linked to the different intended functions may further specify whether the intended functions can be performed by the vehicle VPA. As an example, functions relating to controlling vehicle components such as the vehicle systems 216, the in-vehicle controls 220, the audio amplifier 219, and the speakers 218 may typically be performed by the vehicle VPA. However, other functions such as playing a song by a particular musical artist or navigating to a particular location may require a larger vocabulary for generating the response or may require interaction with a remote service, such as remote service 295. The vocabulary of the vehicle VPA and the functionality of the device platform 238 may be limited with respect to such functions, and so in some examples such intended functions may not be supported by the vehicle VPA.

Thus, if the intent is supported by the vehicle VPA ("YES"), method 500 continues to 522. At 522, the interface system 502 processes the utterance with the vehicle VPA to generate a vehicle VPA response. At 525, one or more vehicle components 506 perform an action according to the vehicle VPA response. Method 500 then returns.

However, referring again to 520, if the intent is not supported by the vehicle VPA ("NO"), method 500 continues to 530. At 530, the interface system 502 transmits the utterance to the mobile device 504. At 535, the mobile device 504 receives the utterance. At 540, the mobile device processes the utterance with the mobile device VPA to generate a mobile device VPA response. At 545, the mobile device 504 transmits the mobile device VPA response to the interface system 502.

At 550, the interface system 502 receives the mobile device VPA response. At 555, one or more vehicle components 506 perform one or more actions according to the mobile device VPA response. Method 500 then returns.

Thus, a method for voice control of a vehicle component includes selectively routing a vocal utterance to an in-vehicle VPA system or to a mobile device VPA system according to an intention of the user. According to one embodiment, a system for controlling a vehicle is provided. The system includes a microphone, at least one vehicle component, and an interface system communicatively coupled to the microphone and the at least one vehicle component. The interface system is configured to: detect, via the microphone, an utterance of a vocal command by an occupant of the vehicle; transmit the utterance to at least one of a virtual personal assistant (VPA) of the vehicle and a VPA of a mobile device positioned within the vehicle; receive control signals from at least one of the VPA of the vehicle and the VPA of the mobile device, the control signals generated according to the vocal command; and transmit the control signals to the at least one vehicle component for controlling the at least one vehicle component.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the vehicle systems and mobile devices described above with respect to FIGS. 1 and 2. The methods may be performed by executing stored instructions with one or more logic devices (e.g., processors) in combination with one or more hardware elements, such as storage devices, memory, hardware network interfaces/antennas, switches, actuators, clock circuits, and so on. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," "third," and so on are used merely as labels, and are not intended to impose numerical requirements or a particular positional order on their objects. The following claims particularly point out subject matter from the above disclosure that is regarded as novel and non-obvious.

The invention claimed is:

1. A system for controlling a vehicle, comprising:
a microphone;
at least one vehicle component; and
an interface system communicatively coupled to the microphone and the at least one vehicle component, the interface system configured to:
detect, via the microphone, an utterance of a vocal command by an occupant of the vehicle;
determine whether a virtual personal assistant (VPA) of the vehicle is present within the vehicle;
transmit the utterance to the VPA of the vehicle, responsive to determining that the VPA of the vehicle is present within the vehicle;
transmit the utterance to a VPA of a mobile device positioned within the vehicle, responsive to determining that the VPA of the vehicle is not present within the vehicle;
receive control signals from at least one of the VPA of the vehicle and the VPA of the mobile device, the control signals generated according to the vocal command; and
transmit the control signals to the at least one vehicle component for controlling the at least one vehicle component.

2. The system of claim 1, wherein the interface system is further configured to determine whether the mobile device is connected to the interface system and active, and display, via a display device communicatively coupled to the interface system, a message to connect the mobile device responsive to determining that the mobile device is not connected to the interface system and active.

3. The system of claim 1, wherein the interface system includes the VPA of the vehicle, and wherein the VPA of the vehicle and the VPA of the mobile device are configured to perform automatic speech recognition on the utterance to identify the vocal command.

4. The system of claim 1, wherein the interface system is further configured to transmit the utterance to both the VPA of the vehicle and the VPA of the mobile device, receive a first control signal from the VPA of the vehicle, receive a second control signal from the VPA of the mobile device, and determine the control signals for the at least one vehicle component by evaluating the first control signal and the second control signal.

5. The system of claim 1, wherein the interface system is further configured to predict an intention of the occupant while receiving the utterance, and transmit the utterance to the VPA of the vehicle or the VPA of the mobile device according to the intention.

6. The system of claim 5, wherein the interface system is configured to predict the intention of the occupant while receiving the utterance by converting at least one word of the utterance to text, comparing the at least one word to a list of commands supported by the VPA of the vehicle.

7. The system of claim 6, wherein the interface system is configured to transmit the utterance to the VPA of the vehicle if the at least one word matches at least one command in the list of commands, and otherwise transmit the utterance to the VPA of the mobile device.

8. The system of claim 1, wherein the at least one vehicle component includes one or more of a speaker system of the vehicle, an engine system of the vehicle, an auxiliary system of the vehicle, a cruise control system of the vehicle, a display system of the vehicle, and a climate control system of the vehicle.

9. A method of controlling vehicle systems of a vehicle with a mobile device, the method comprising:
receiving, at an in-vehicle interface system via a microphone, an utterance of a vocal command by an occupant of the vehicle;
determining whether a virtual personal assistant (VPA) of the vehicle is present within the vehicle;
transmitting the utterance from the in-vehicle interface system to the VPA of the vehicle, responsive to determining that the VPA of the vehicle is present within the vehicle;
transmitting the utterance from the in-vehicle interface system to the mobile device, responsive to determining that the VPA of the vehicle is not present within the vehicle;
receiving, at the in-vehicle interface system, a control signal from at least one of the VPA of the vehicle and the mobile device, the control signal generated according to the vocal command; and
transmitting the control signal from the in-vehicle interface system to at least one vehicle system of the vehicle for controlling the at least one vehicle system.

10. The method of claim 9, further comprising:
predicting, with the in-vehicle interface system, an intended command while receiving the utterance;
determining that the in-vehicle interface system supports the intended command; and
transmitting the utterance to the mobile device responsive to determining that the in-vehicle interface system does not support the intended command.

11. The method of claim 10, further comprising not transmitting the utterance to the mobile device responsive to determining that the in-vehicle interface system supports the intended command.

12. The method of claim 11, further comprising, responsive to determining that the in-vehicle interface system supports the intended command:
processing, with the in-vehicle interface system, the utterance to determine the command;
generating, with the in-vehicle interface system, a second control signal according to the command; and
transmitting the second control signal from the in-vehicle interface system to the at least one vehicle system for controlling the at least one vehicle system.

13. The method of claim 9, further comprising:
processing, with the in-vehicle interface system, the utterance to determine the command;

generating, with the in-vehicle interface system, a second control signal according to the command;

evaluating the control signal from the mobile device and the second control signal to determine a final control signal; and transmitting the final control signal to the at least one vehicle system for controlling the at least one vehicle system.

14. The method of claim 13, wherein evaluating the control signal and the second control signal to determine the final control signal comprises receiving the control signal before the second control signal and selecting the control signal as the final control signal, or receiving the second control signal before the control signal and selecting the second control signal as the final control signal.

15. A system for controlling a vehicle system of a vehicle, comprising:

a mobile device positioned with the vehicle;

an interface system integrated into the vehicle and communicatively coupled to the vehicle system and the mobile device, the interface system configured to:

receive, via a microphone, an utterance of a command by an occupant of the vehicle;

determine whether the interface system includes a speech recognition system;

transmit the utterance from the interface system to a virtual personal assistant (VPA) of the vehicle, responsive to determining that the interface system includes a speech recognition system;

transmit the utterance from the interface system to the mobile device, responsive to determining that the interface system does not include a speech recognition system;

receive, at the interface system, a control signal from at least one of the VPA of the vehicle and the mobile device; and transmit the control signal from the interface system to the vehicle system for controlling the vehicle system;

wherein the mobile device is configured to:

receive the utterance from the interface system;

convert the utterance to a natural language text;

identify the command in the natural language text;

generate the control signal according to the command; and transmit the control signal to the interface system.

16. The system of claim 15, wherein the interface system is configured to transmit the utterance to the mobile device responsive to determining that the mobile device is communicatively coupled to the interface system and active.

17. The system of claim 15, wherein the mobile device is configured to access a remote service via a network to generate the control signal.

18. The system of claim 15, wherein the vehicle system includes one or more of a display system, an audio system, a cruise control system, a climate control system, one or more steering wheel controls, one or more instrument panel controls, one or more vehicle sensors, and a device platform of the interface system.

* * * * *